(12) United States Patent
Kobayashi et al.

(10) Patent No.: US 6,862,019 B2
(45) Date of Patent: Mar. 1, 2005

(54) COORDINATE INPUT APPARATUS, CONTROL METHOD THEREFOR, AND COMPUTER-READABLE MEMORY

(75) Inventors: Katsuyuki Kobayashi, Kanagawa (JP); Yuichiro Yoshimura, Kanagawa (JP); Hajime Sato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 232 days.

(21) Appl. No.: 10/066,569

(22) Filed: Feb. 6, 2002

(65) Prior Publication Data

US 2002/0130850 A1 Sep. 19, 2002

(30) Foreign Application Priority Data

Feb. 8, 2001 (JP) ........................ 2001-032290

(51) Int. Cl.⁷ ........................ G09G 5/00; G08C 21/00
(52) U.S. Cl. ........................ 345/173; 345/174; 345/176; 345/178; 178/18.01; 178/18.03; 178/18.05; 178/18.06
(58) Field of Search ........................ 345/173, 174, 345/176, 178, 179; 178/18.01, 18.03, 18.05, 18.06, 18.07, 19.01, 19.03, 19.04, 19.05, 18.02

(56) References Cited

U.S. PATENT DOCUMENTS

| | | | |
|---|---|---|---|
| 4,613,964 A | 9/1986 | Ichikawa et al. | 369/45 |
| 4,886,943 A | 12/1989 | Suzuki et al. | 178/18 |
| 4,887,245 A | 12/1989 | Mori et al. | 367/129 |
| 4,897,510 A | 1/1990 | Tanaka et al. | 178/18 |
| 4,910,363 A | 3/1990 | Kobayashi et al. | 178/18 |
| 4,931,965 A | 6/1990 | Kaneko et al. | 364/560 |
| 4,980,518 A | 12/1990 | Kobayashi et al. | 178/18 |
| 5,017,913 A | 5/1991 | Kaneko et al. | 340/712 |
| 5,070,325 A | 12/1991 | Tanaka et al. | 340/706 |
| 5,097,102 A | 3/1992 | Yoshimura et al. | 178/18 |
| 5,142,106 A | 8/1992 | Yoshimura et al. | 178/18 |
| 5,210,785 A | 5/1993 | Sato et al. | 379/58 |
| 5,231,394 A | 7/1993 | Sato | 341/50 |
| 5,239,138 A | 8/1993 | Kobayashi et al. | 178/18 |
| 5,500,492 A | 3/1996 | Kobayashi et al. | 178/18 |
| 5,517,553 A | 5/1996 | Sato | 379/58 |
| 5,539,678 A | 7/1996 | Tanaka et al. | 364/561 |
| 5,565,893 A | 10/1996 | Sato et al. | 345/177 |
| 5,587,558 A | * 12/1996 | Matsushima | 178/18.01 |
| 5,615,318 A | * 3/1997 | Matsuura | 345/420 |
| 5,621,300 A | 4/1997 | Sato et al. | 320/5 |
| 5,714,698 A | 2/1998 | Tokioka et al. | 73/865.4 |
| 5,736,979 A | 4/1998 | Kobayashi et al. | 345/177 |
| 5,751,133 A | 5/1998 | Sato et al. | 320/13 |
| 5,805,147 A | 9/1998 | Tokioka et al. | 345/173 |
| 5,818,429 A | 10/1998 | Tanaka et al. | 345/173 |
| 5,831,603 A | 11/1998 | Yoshimura et al. | 345/177 |
| 5,933,149 A | 8/1999 | Mori et al. | 345/442 |
| 5,936,207 A | 8/1999 | Kobayashi et al. | 178/18.01 |
| 6,359,616 B1 | 3/2002 | Ogura et al. | 345/173 |

* cited by examiner

Primary Examiner—Vijay Shankar
(74) Attorney, Agent, or Firm—Fitzpatrick, Cella, Harper & Scinto

(57) ABSTRACT

A signal waveform detection circuit detects the three-dimensional coordinate value of an indicating tool which is defined in the first, second, and third dimensions. An arithmetic control circuit compares the coordinate value in the first dimension of the three-dimensional coordinate value with a predetermined value, and controls outputting of the coordinate values in the second and third dimensions on the basis of the comparison result.

13 Claims, 14 Drawing Sheets

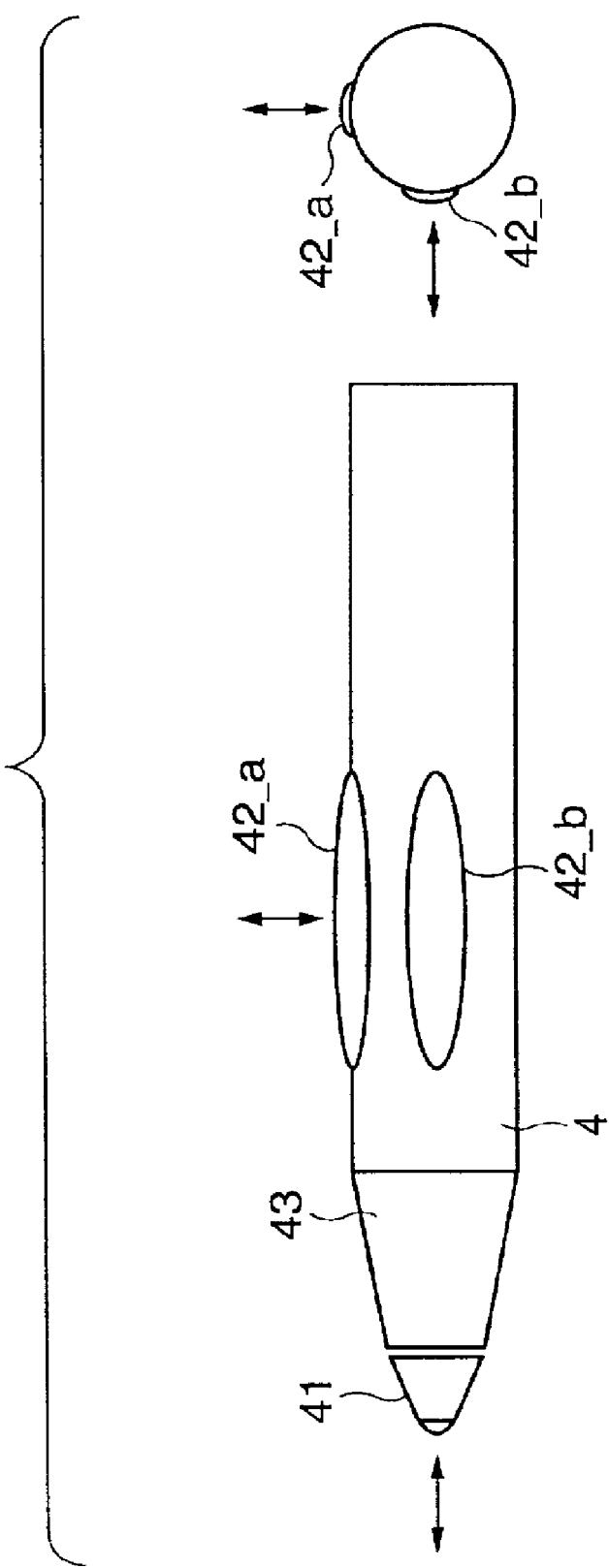

FIG. 10A

| PEN OPERATION MODE | OUTPUT COORDINATE MODE | PEN TIP SW 41 | SW1 42_a | SW2 42_b | DRIVING MODE 1(50p/sec) | DRIVING MODE 2(40p/sec) | COORDINATE CALCULATION VALUE IN Z-AXIS DIRECTION |
|---|---|---|---|---|---|---|---|
| PEN INPUT OPERATION | ABSOLUTE COORDINATES | ON | — | — | ○ | | (300mm OR LESS) |
| PROXIMITY INPUT OPERATION | ABSOLUTE COORDINATES | OFF | ON | OFF | | ○ | 300mm OR LESS |
| PROXIMITY INPUT OPERATION | ABSOLUTE COORDINATES | OFF | OFF | ON | | ○ | 300mm OR LESS |
| PROXIMITY INPUT OPERATION | ABSOLUTE COORDINATES | OFF | ON | ON | ○ | | 300mm OR LESS |
| REMOTE INPUT OPERATION | RELATIVE COORDINATES | OFF | ON | OFF | | ○ | 1000mm OR MORE |
| REMOTE INPUT OPERATION | RELATIVE COORDINATES | OFF | OFF | ON | | ○ | 1000mm OR MORE |
| REMOTE INPUT OPERATION | RELATIVE COORDINATES | OFF | ON | ON | ○ | | 1000mm OR MORE |

F I G. 13
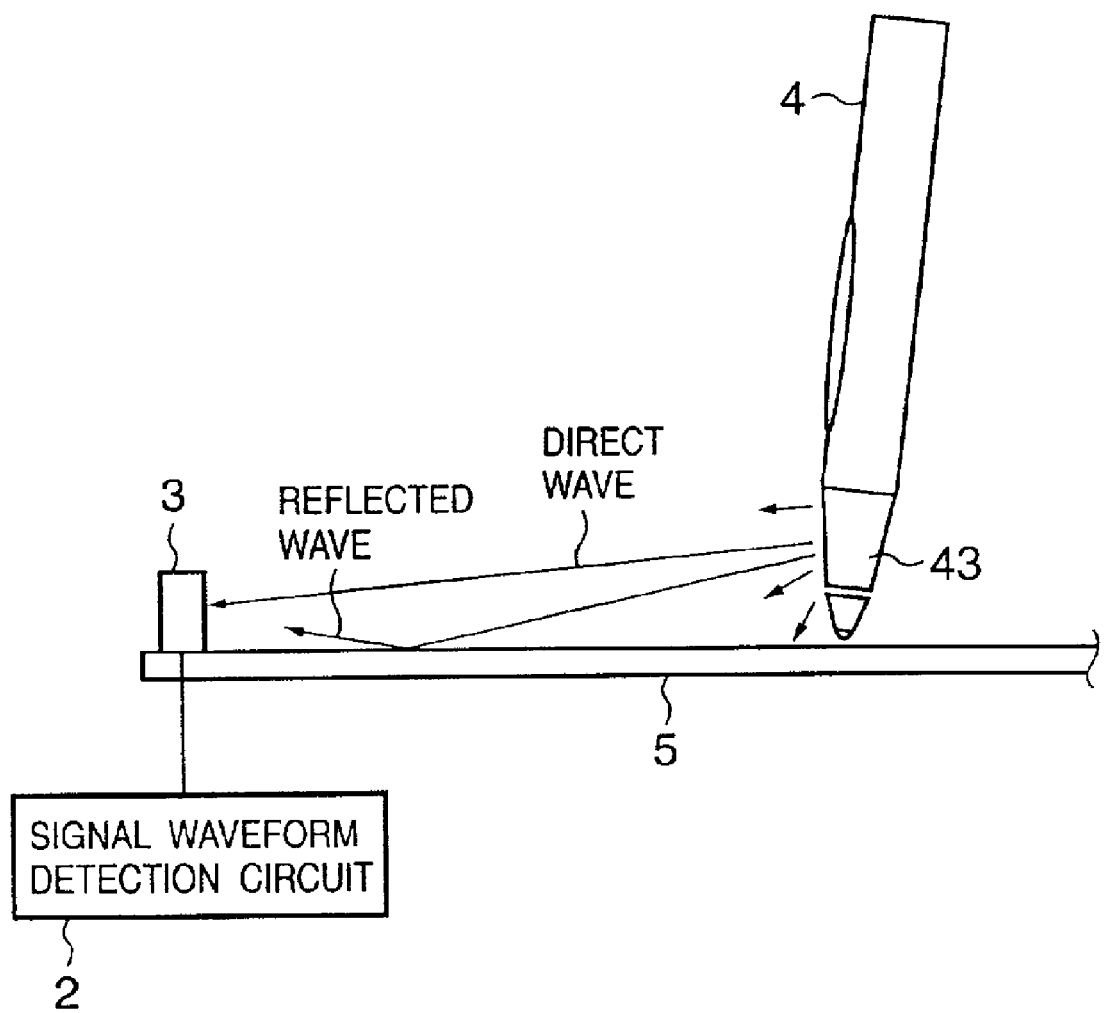

COORDINATE INPUT APPARATUS, CONTROL METHOD THEREFOR, AND COMPUTER-READABLE MEMORY

FIELD OF THE INVENTION

The present invention relates to a coordinate input apparatus for detecting the three-dimensional position coordinates of an indicating tool, a control method for the apparatus, and a computer-readable memory.

BACKGROUND OF THE INVENTION

Conventionally, an apparatus is known, which overlays a coordinate input apparatus capable of inputting coordinates on the display window of a display such as a CRT display, liquid crystal display (LC), or projector, and displays a handwriting based on pointing or writing performed by an operator on the display, thereby realizing a relationship like the one between paper and pencil.

Examples of a coordinate input apparatus are a resistive film input apparatus, an electrostatic input apparatus, an apparatus having a transparent input panel such as an ultrasonic panel for propagating ultrasonic waves on a coordinate input surface made of glass or the like, an optical input apparatus, an apparatus for detecting a position by emitting sound waves into the air, and an apparatus based on an electromagnetic induction (electromagnetic exchange) scheme, which has a coordinate calculating mechanism and transparent protective plate placed on the rear side and front surface of a display, respectively, to form an integral input/output information apparatus.

Such information apparatuses that have recently developed include a pen input computer with a relatively large size or the like along a trend toward larger displays as well as a portable compact electronic notebook. Such information apparatuses are being used for presentation apparatuses, videoconference systems, and the like in combination with large displays such as front projectors, rear projectors, and PDPs. Displays such as large liquid crystal displays and PDP displays have currently been improved in image quality and reduced in cost. In addition, in parallel with digitization of satellite broadcasts and the like, TV specifications/forms have begun to enter an age of transition.

These large displays have replaced, for example, whiteboards or electronic blackboards used in offices and have begun to be used for conferences or meetings in which data prepared in personal computers are displayed on the large displays. In such a case, for example, the contents of information displayed on the display window of a large display can be switched, like those on a whiteboard, by an operator or participant when he/she directly touches the window to control the personal computer so as to update the display information.

Of coordinate input apparatuses of these types, however, a resistive film input apparatus, an electrostatic input apparatus, and the like have difficulty in forming a perfectly transparent input panel, resulting in a deterioration in the quality of images displayed on the display. In addition, in an ultrasonic input apparatus requiring a propagation medium such as a glass member, the surface of the glass member must be optically processed to prevent the glare of a fluorescent lamp when the apparatus is used indoors. It is therefore inevitable that it will cost much to maintain the quality of images. An electromagnetic induction input apparatus has a matrix of electrodes formed on the rear side of the display surface, and transmits/receives electromagnetic signals to/from an input pen. As a display apparatus increases in size and thickness, it becomes difficult in principle to calculate coordinates. In addition, when a large coordinate input apparatus is to be formed based on this technique for conferences or presentation, the apparatus becomes very expensive.

When a large display apparatus is to be used, the apparatus is required to have sufficient performance in terms of viewing angle, contrast, and the like because it is assumed that a large audience will watch the screen. When, therefore, such a large display apparatus and coordinate input apparatus are to be combined, it is a significant challenge to prevent a deterioration in the image quality of the display apparatus as well as allowing high-precision calculation of coordinates at a sufficiently low cost.

Consider a large integral input/output system of this type. In consideration of a meeting with a large number of participants and the network age, the system is preferably designed to allow an inquirer to operate a screen in an arbitrary place by remote control or acquire information from a network, as needed, as well as making an operator control a personal computer by directly touching the screen.

SUMMARY OF THE INVENTION

The present invention has been made to solve the above problems, and has as its object to provide a coordinate input apparatus which can accurately calculate coordinates at a low cost even if a relatively large display is used, a control method for the apparatus, and a computer-readable memory.

According to the present invention, the foregoing object is attained by providing a coordinate input apparatus which detects three-dimensional position coordinates of an indicating tool, comprising detection means for detecting a three-dimensional coordinate value of the indicating tool which is defined in first, second, and third dimensions, comparing means for comparing a coordinate value in the first dimension of the three-dimensional coordinate value with a predetermined value, and control means for controlling outputting of coordinate values in the second and third dimensions on the basis of the comparison result obtained by said comparing means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 9 is a view showing the outer appearance of a coordinate input pen according to the present invention;

FIG. 10A is a view for explaining the driving modes of the coordinate input pen according to the present invention;

FIG. 13 is a view for explaining the difference in path length between a direct wave and a reflected wave according to the present invention.

DETAILED DESCRIPTION OF THE PREFERRED EMBODIMENTS

The preferred embodiments of the present invention will be described in detail below with reference to the accompanying drawings.

Figure 1:
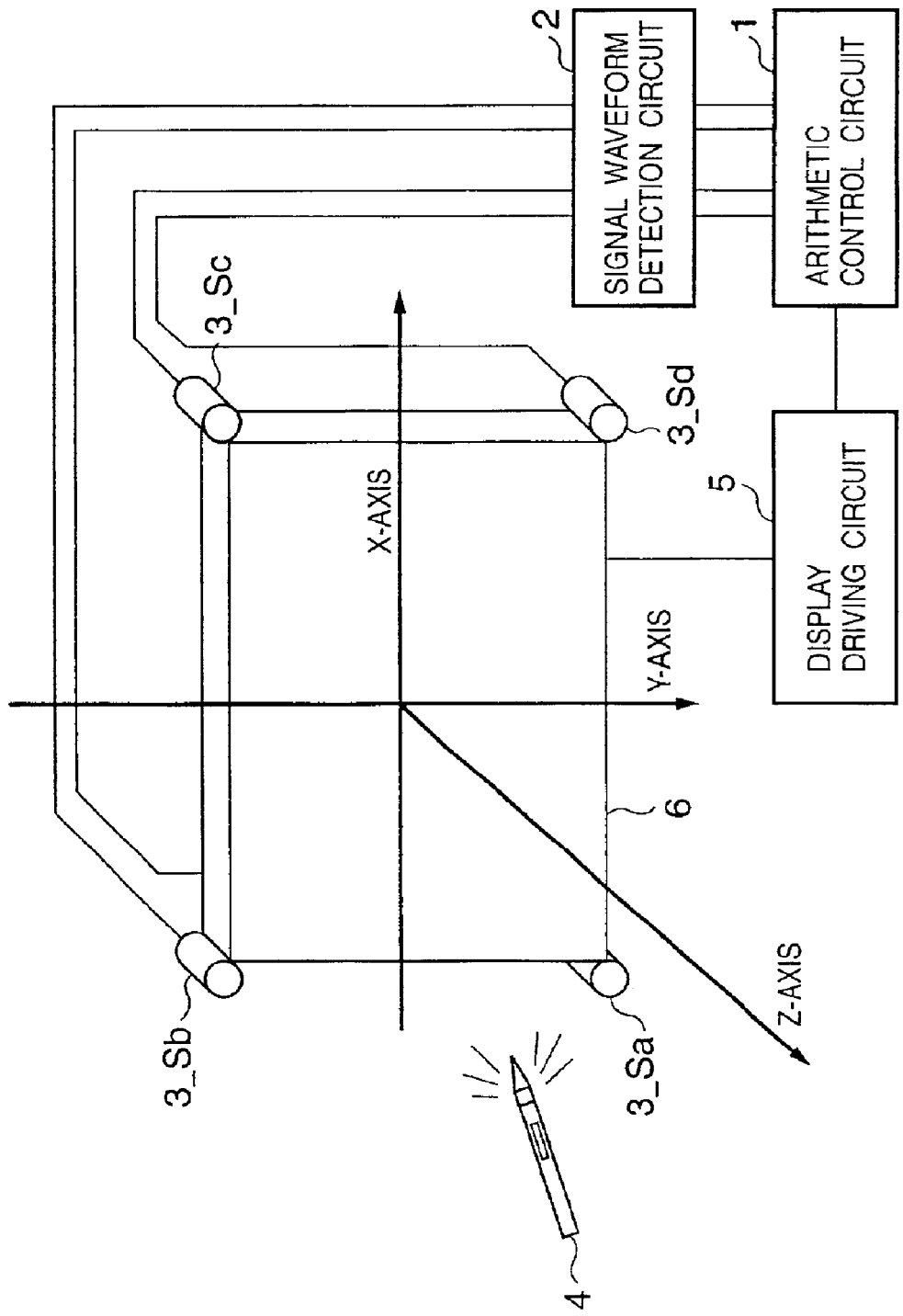
FIG. 1 is a view showing the schematic arrangement of a coordinate input apparatus capable of measuring three-dimensional (space) coordinates according to the present invention.

FIG. 1 is a view showing the schematic arrangement of a coordinate input apparatus capable of three-dimensional (space) coordinate measurement according to the present invention.

Reference numeral 4 denotes a coordinate input pen 4 serving as a writing tool designed to generate a sound wave into the air in accordance with the coordinate input operation performed by an operator. The generated sound wave is detected by a plurality of sensors 3 (four sensors 3_Sa to 3_Sd in this embodiment). The resultant information is processed by a signal waveform detection circuit 2 using a method to be described later, thereby calculating a sound wave source position (X, Y, Z) of the coordinate input pen 4.

The arithmetic control circuit 1 controls the overall apparatus and is designed to move the cursor displayed on a display 6 or display and additionally write handwriting information such as writing through a display driving circuit 5 on the basis of obtained coordinate data.

As described above, by combining the coordinate input apparatus and display, a man-machine interface capable of realizing a relationship like the one between "paper and pen" can be provided.

The arrangement of the coordinate input pen 4 will be described next with reference to FIG. 2.

Figure 2:
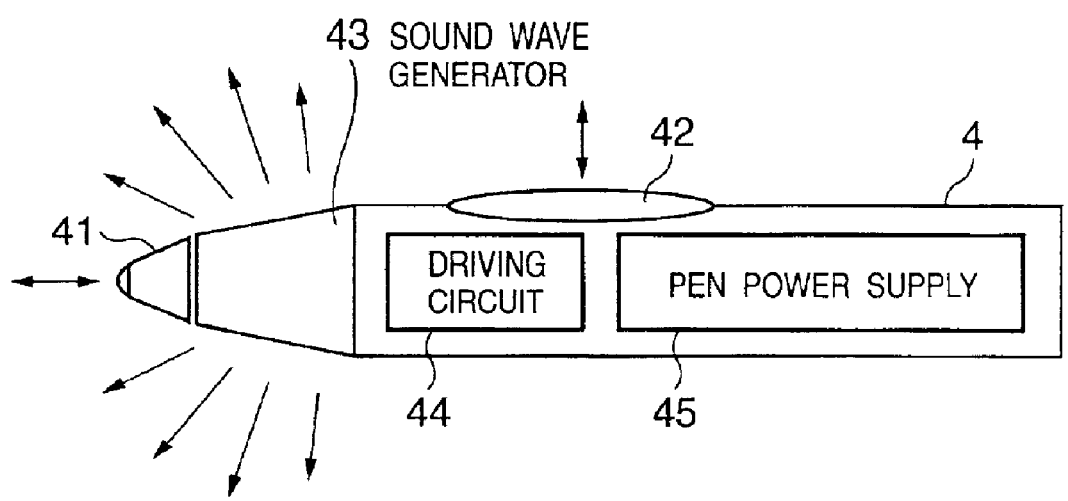
FIG. 2 is a view showing the arrangement of a coordinate input pen according to the present invention.

FIG. 2 is a view showing the arrangement of the coordinate input pen according to the present invention.

A sound wave generator 43 incorporated in the coordinate input pen 4 is driven by a pen power supply 45 and a driving circuit 44 constituted by a timer, an oscillation circuit, a control circuit for performing control upon detecting information from a plurality of switches mounted in the coordinate input pen 4, and the like. A driving signal for the sound wave generator 43 is a pulse signal which is generated by the timer and repeats at a predetermined period. This signal is amplified with a predetermined gain by the oscillation circuit and applied to the sound wave generator 43. This electrical driving signal is converted into mechanical vibrations by the sound wave generator 43. As a consequence, the energy of the vibrations is emitted into the air.

Note that the coordinate input pen 4 in the first embodiment includes a pen tip switch (SW) 41 which operates when the pen tip is pressed, and a plurality of pen side switches (SW) 42 mounted in the housing of the coordinate input pen 4.

The driving circuit 44 outputs a signal for driving the sound wave generator 43 in the coordinate input pen 4 at a predetermined period (e.g., every 10 msec; in this case, since a sound wave is emitted 100 times per sec, the coordinate output sampling rate in this coordinate input apparatus is 100/sec). This sound wave arrives at the respective sensors 3_Sa to 3_Sd to be detected with delays corresponding to the distances from the sound wave generator 43 to the sensors 3_Sa to 3_Sd. This type of coordinate input apparatus is a system basically designed to calculate the distances between the sound wave generator 43 and sensors 3_Sa to 3_Sd from the products of the known sound velocity of a sound wave and the respective arrival times and geometrically obtain the position information of the sound wave generator 43 by using the position information from each of the sensors 3_Sa to 3_Sd. A method of detecting the arrival times of this sound wave will be described with reference to FIGS. 3 and 4.

Figure 3:
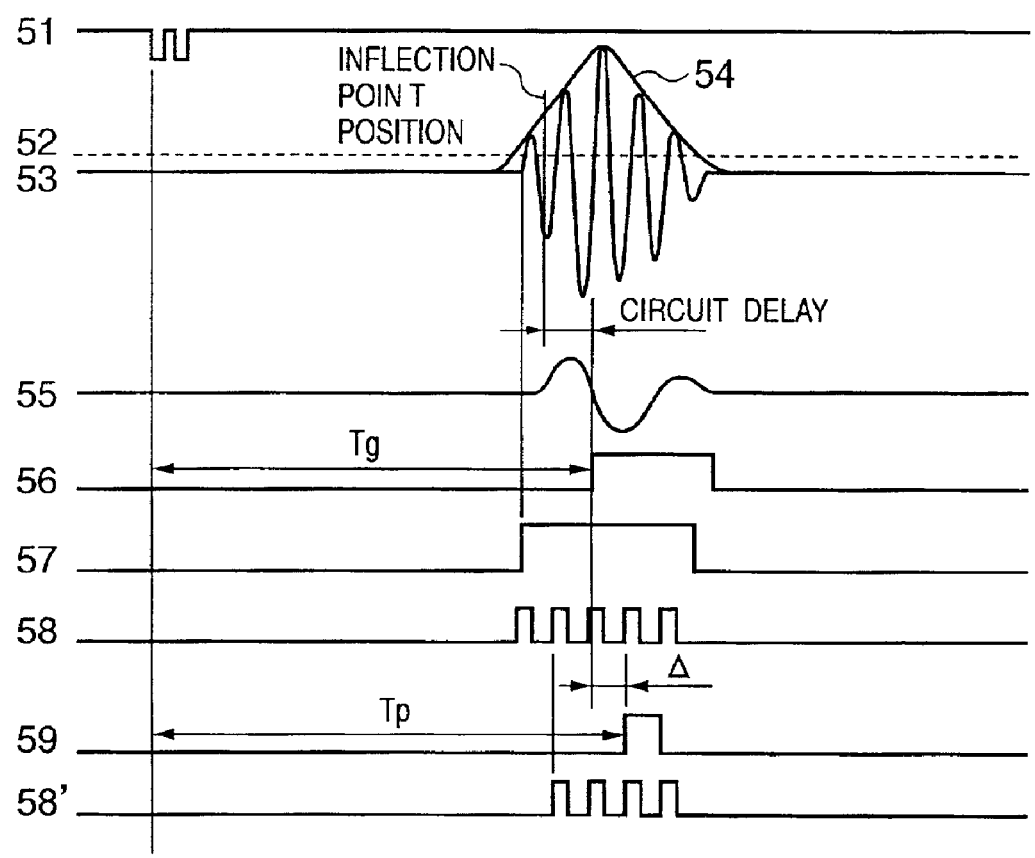
FIG. 3 is a timing chart for explaining a method of detecting the arrival time of a sound wave according to the present invention.
Figure 4:
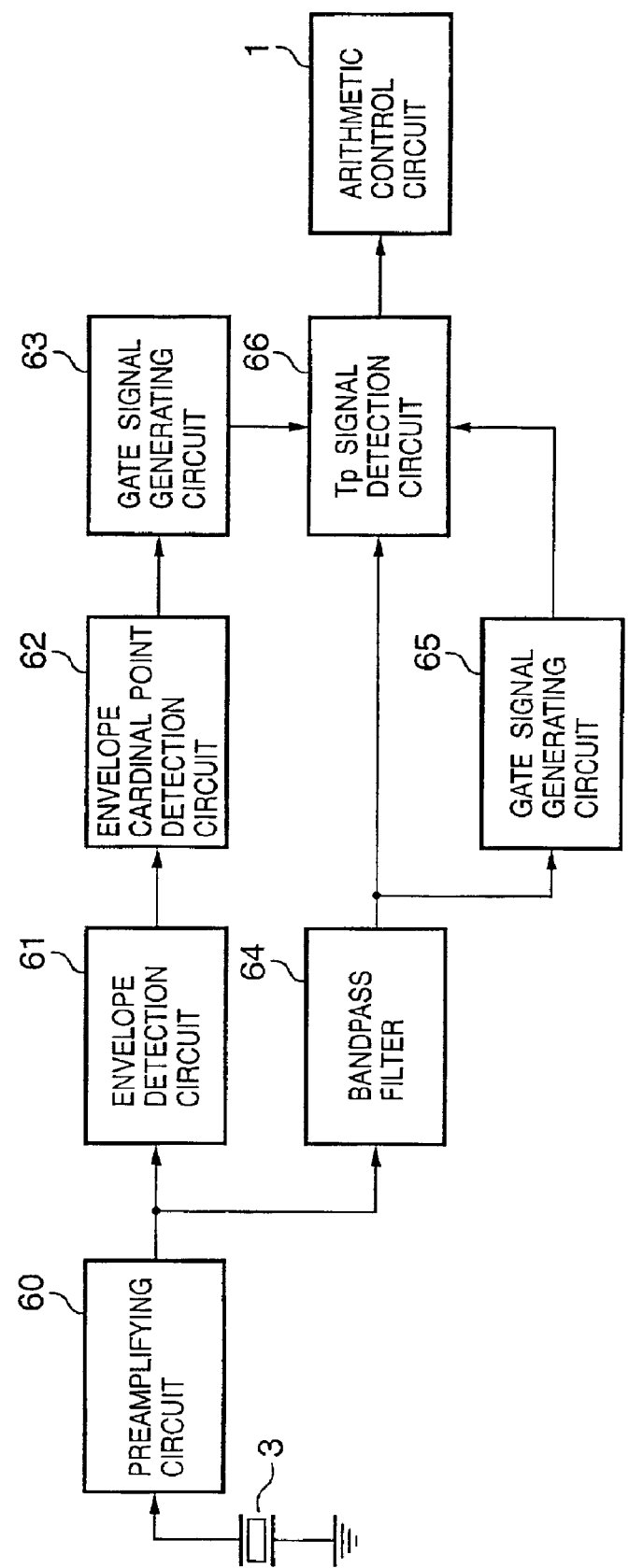
FIG. 4 is a block diagram of a circuit for realizing sound wave arrival time detection according to the present invention.

FIG. 3 is a timing chart for explaining a method of detecting the arrival times of a sound wave according to the present invention. FIG. 4 is a block diagram of a circuit which implements detection of the arrival times of a sound wave according to the present invention.

Note that in the present invention, as sound wave arrival time detection methods, three embodiments, i.e., the first to third embodiments, will be described below.

In the first embodiment, reference numeral 51 denotes a driving signal generated by the driving circuit 44. Upon generation of the driving signal 51, a start signal is generated. This start signal is sent to the arithmetic control circuit 1 through, for example, an infrared LED or the like (not shown) incorporated in the coordinate input pen 4 to start a timer 12 (see FIG. 5) in the arithmetic control circuit 1.

The sound wave emitted into the air is detected by the sensors 3_Sa to 3_Sd with delays corresponding to the distances between the sound wave generator 43 and the sensors 3_Sa to 3_Sd. Reference numeral 53 denotes a detection signal detected by the sensors 3_Sa to 3_Sd and amplified to a predetermined level by a preamplifying circuit 60. This detection signal 53 is processed by an envelope detection circuit 61 constituted by an absolute value circuit, a low-pass filter, and the like to extract only an envelope 54 from the detection signal.

Consider this envelope 54. The sound velocity at which the waveform of the envelope 54 propagates is a group velocity Vg. If a cardinal point of the envelope 54, e.g., a peak or inflection point of the envelope 54, is detected, a delay time tg associated with the group velocity Vg is obtained. An envelope cardinal point detection circuit 62 for detecting a peak or inflection point of the envelope 54 can easily detect such a point by using a differentiating circuit and zero-crossing comparator. In the first embodiment, second-order differentiation is performed to form a signal 55, and an inflection point of the envelope 54 is detected (signal 56) by referring to a gate signal 57 compared with the threshold level 52 and signal 53. When the timer 12 which is operated by the above start signal is stopped by using this signal 56, a group delay time Tg associated with the group velocity Vg can be detected. (Note that the block diagram of FIG. 4 shows no arrangement for detecting this group delay time Tg.)

Strictly speaking, this group delay time Tg includes a delay in the circuit associated with waveform processing. However, by a method to be described later, the influence of such a delay is completely eliminated. For the sake of simple explanation, therefore, it is assumed that there is no circuit delay time.

According to the above description, the distance L between the sound wave generator 43 and each of the sensors 3_Sa to 3_Sd can be obtained by the following equation:

$$L = Vg \times Tg \quad (1)$$

According to the second embodiment configured to calculate a distance L with a higher precision, the time when a sound wave arrives is calculated from the phase information of a detection signal waveform. This method will be described in detail. An output signal 53 from sensors 3_Sa to 3_Sd is input to a Tp signal detection circuit 66 after unnecessary frequency components are removed from the signal by a bandpass filter 64. The Tp signal detection circuit 66 is comprised of a zero-crossing comparator, multivibrator, and the like. A signal associated with a zero-crossing point of the signal output from the bandpass filter 64 is compared with a gate signal 57 generated by a gate signal generating circuit 65 for comparing a signal with a predetermined threshold level, thereby generating a signal 58.

After this operation, a signal 56 for detecting the group delay time Tg described above is referred to as a gate signal (generated by a gate signal generating circuit 63), thereby generating a signal 59 that outputs the first zero-crossing point within the duration of this gate signal 56 at which the phase of the signal waveform output from the bandpass filter 64 crosses from the negative side to the positive side.

Likewise, a phase delay time Tp associated with a phase velocity Vp can be detected such that a timer 12 operating in accordance with the start signal described above is stopped using this signal 59.

Strictly speaking, this phase delay time Tp includes a delay in the circuit associated with waveform processing. However, by a method to be described later, the influence of such a delay is completely eliminated. For the sake of simple explanation, therefore, it is assumed that there is no circuit delay time.

According to the above description, the distance L between a sound wave generator 43 and each of the sensors 3_Sa to 3_Sd can be obtained by the following equation:

$$L = Vp \times Tp \quad (2)$$

The effect obtained by using the gate signal 56 generated by the gate signal generating circuit 63 on the basis of an envelope cardinal point detection circuit 62 will be described below.

The signal levels detected by the sensors 3_Sa to 3_Sd vary due to the following factors:

1) the electromechanical conversion efficiencies of the sound wave generator 43 and sensors 3_Sa to 3_Sd;
2) the distances between the sound wave generator 43 and the sensors 3_Sa to 3_Sd;
3) environmental variations in temperature, humidity, and the like in the air through which sound waves propagate; and
4) the directivity of the sound wave generator 43 with respect to sound wave emission, and the sensitivity (directivity) of the sensors 3_Sa to 3_Sd.

Item 1) is the factor originating from part tolerances, to which adequate consideration must be given when apparatuses are to be mass-produced. Item 2) is the factor associated with the attenuation of sound waves. It is generally known that the signal levels of sound waves propagating in the air exponentially attenuate as the distances between the sound wave generator 43 and the sensors 3_Sa to 3_Sd increase. In addition, the attenuation coefficient changes due to environmental changes in item 3). With regard to item 4), since the present invention operates as a coordinate input apparatus, the posture of the coordinate input pen 4 serving as a writing tool always changes as the operator performs writing operation, i.e., the pen holding angle varies. The detection level greatly changes depending on such variations. In addition, the detection level also varies owing to the sensitivity directivity of the sensors 3_Sa to 3_Sd as the angles defined by the coordinate input pen 4 and the sensors 3_Sa to 3_Sd vary. Assume that the detection level has decreased. In this case, since the above threshold level (e.g., a signal 52) is fixed, a phenomenon in which the signal 58 changes to a signal 58' is likely to occur. Assume that coordinate input operation is performed at the same point. Even in this case, if, for example, the coordinate input pen 4 is held at different angles (in different directions), the detection signal 53 has different levels. Therefore, the time when the gate signal 57 is generated depends the different levels. In the present invention, however, since the gate signal 56 based on a cardinal point of the envelope 54 is referred to, the signal 59 can be stably obtained independently of the detection signal level.

The schematic arrangement of an arithmetic control circuit 1 according to the present invention will be described next with reference to FIG. 5.

Figure 5:
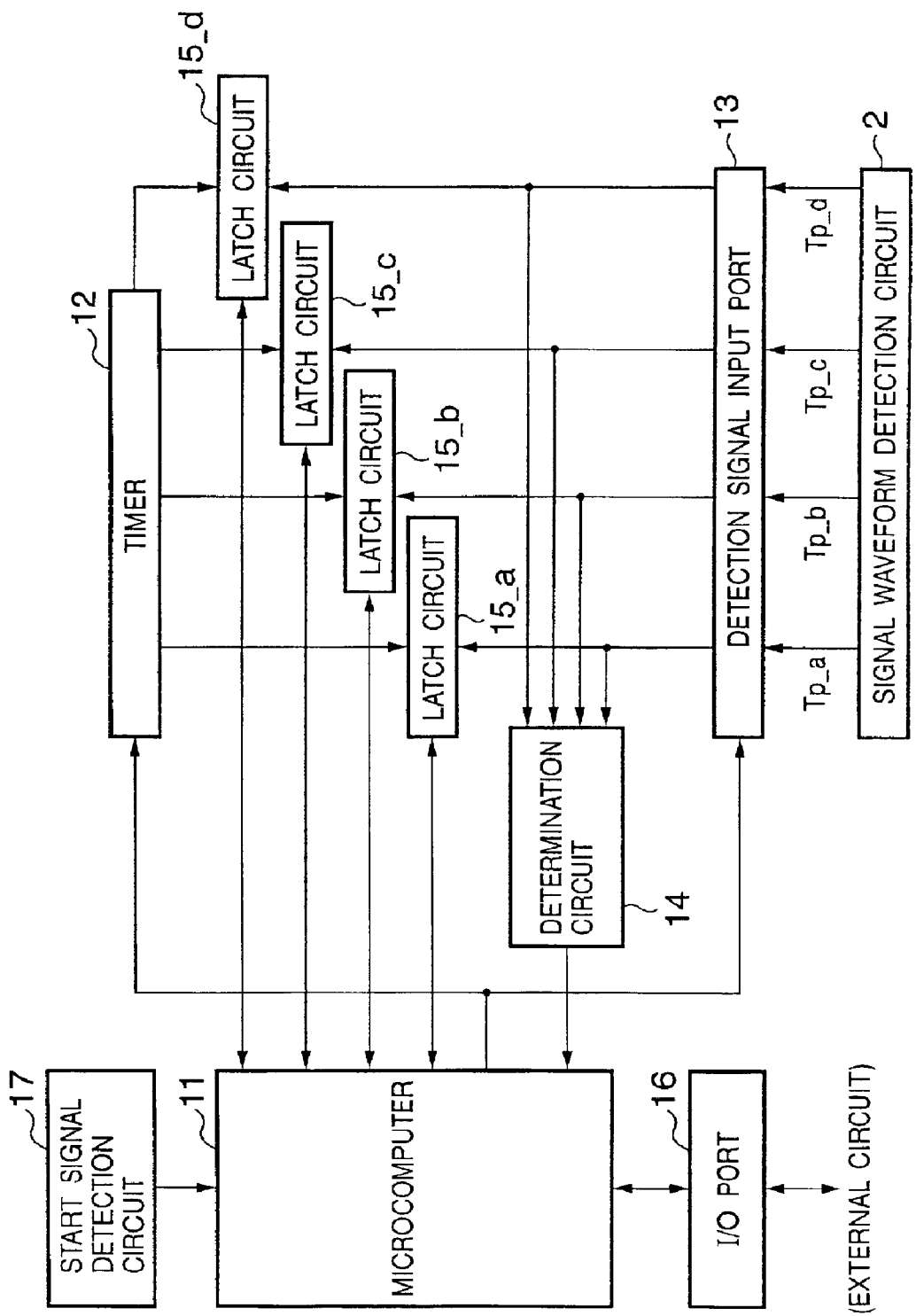
FIG. 5 is a block diagram showing the schematic arrangement of an arithmetic control circuit according to the present invention.

FIG. 5 is a block diagram showing the schematic arrangement of the arithmetic control circuit 1 according to the present invention.

Reference numeral 11 denotes a microcomputer for controlling the arithmetic control circuit 1 and the overall coordinate input apparatus. The microcomputer 11 is comprised of an internal counter, a ROM storing procedures, a RAM used for calculation and the like, a nonvolatile memory storing constants and the like, and the like. As described above, a driving circuit 44 emits a start signal, which is synchronous with the driving timing of the sound wave generator 43 in a coordinate input pen 4, as a light signal via an infrared LED or the like (not shown) incorporated in the coordinate input pen 4. This signal is detected by a start signal detection circuit 17 to start the timer 12 (e.g., formed by a counter or the like) in the arithmetic control circuit 1.

With this arrangement, the driving timing at which the sound wave generator 43 in the coordinate input pen 4 is driven can be synchronized with the timer 12 in the arithmetic control circuit 1, the time required for the sound wave generated by the sound wave generator 43 to arrive at each of the sensors 3_Sa to 3_Sd can be measured.

A vibration arrival timing signal (the signal 56 or a signal 59 to be described later) based on each of the sensors 3_Sa to 3_Sd and output from the signal waveform detection circuit 2 is input to a corresponding one of latch circuits 15_a to 15_d through a detection signal input port 13. Upon receiving the vibration arrival timing signals from the corresponding sensors 3_Sa to 3_Sd, the latch circuits 15_a to 15_d latch the count values of the timer 12 at the corresponding times.

Upon detecting that all the detection signals required for coordinate detection are received in this manner, a determination circuit 14 outputs a corresponding signal to a microcomputer 11. Upon receiving this signal from the determination circuit 14, the microcomputer 11 reads out the vibration arrival times corresponding to the respective sensors 3_Sa to 3_Sd from the latch circuits 15_a to 15_d and calculates the coordinate position of the coordinate input pen 4 by performing a predetermined calculation. The microcomputer 11 then outputs the calculation result to the display driving circuit 5 through an I/O port 16, thereby displaying, for example, a dot at a corresponding position on the display 6. In addition, by outputting the coordinate position information to an interface circuit (not shown) through the I/O port 16, a three-dimensional coordinate value can be output to an external device.

As the third embodiment, a method of accurately obtaining a distance L independently of the detection signal level will be described below.

Figure 6:
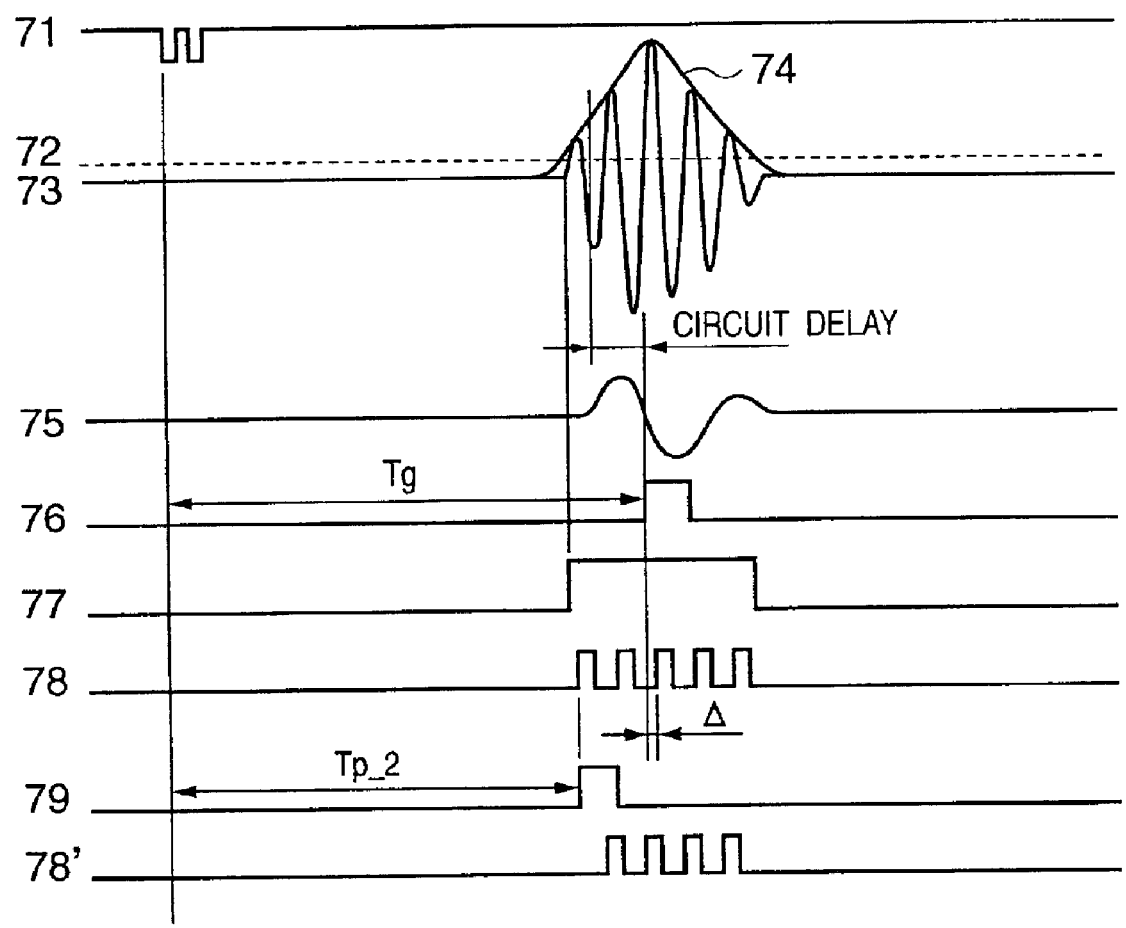
FIG. 6 is a timing chart for explaining a sound wave arrival time detection method according to the present invention.
Figure 7:
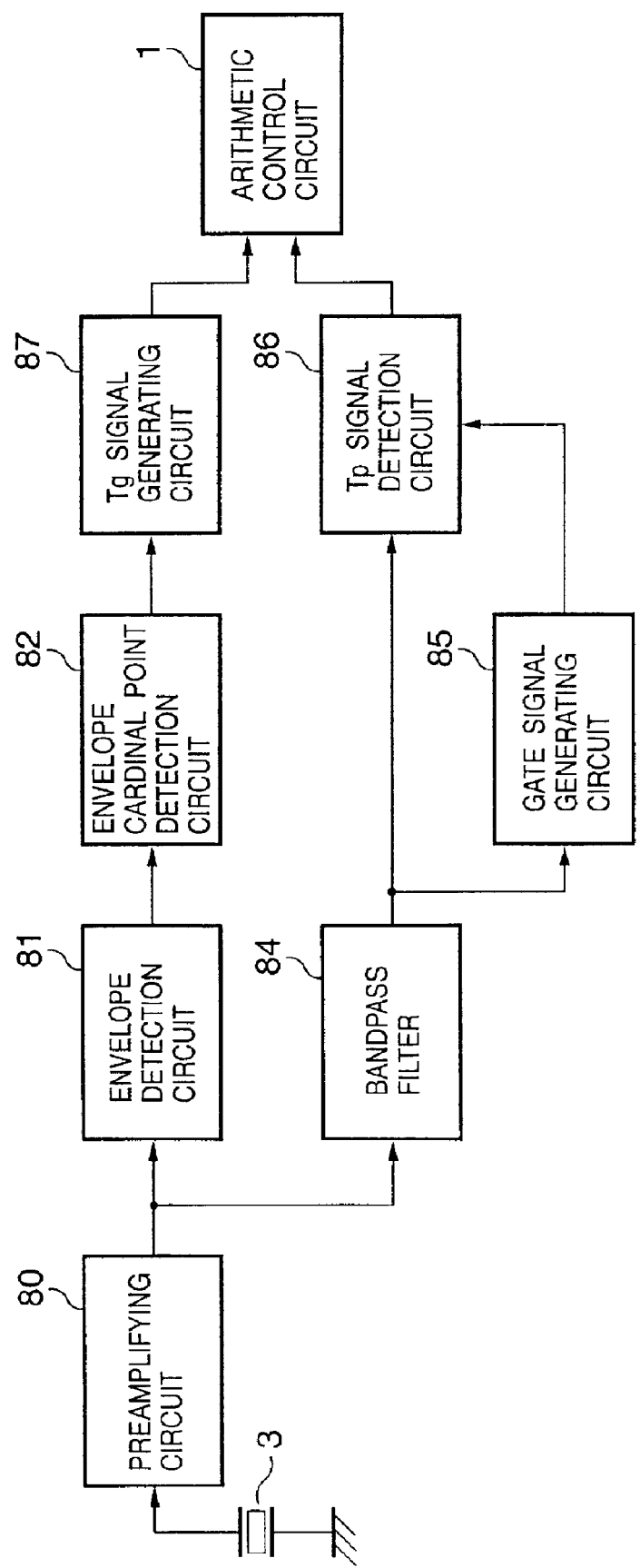
FIG. 7 is a block diagram of a circuit for realizing sound wave arrival time detection according to the present invention.

Referring to FIGS. 6 and 7, reference numeral 71 denotes a driving signal generated by a driving circuit 44. Upon generation of the driving signal 71, a start signal is generated. This start signal is sent to an arithmetic control circuit 1 through, for example, an infrared LED or the like (not shown) incorporated in a coordinate input pen 4 to start a timer 12 in the arithmetic control circuit 1.

The sound wave emitted into the air is detected by sensors 3_Sa to 3_Sd with delays corresponding to the distances between a sound wave generator 43 and the sensors 3_Sa to 3_Sd. Reference numeral 73 denotes a detection signal detected by the sensors 3_Sa to 3_Sd and amplified to a predetermined level by a preamplifying circuit 80. This detection signal 73 is processed by an envelope detection circuit 81 constituted by an absolute value circuit, a low-pass filter, and the like to extract only an envelope 74 from the detection signal 73.

Consider this envelope 74. The sound velocity at which the waveform of the envelope 74 propagates is a group velocity Vg. If a cardinal point of the envelope 74, e.g., a peak or inflection point of the envelope 74, is detected, a delay time tg associated with the group velocity Vg is obtained. An envelope cardinal point detection circuit 82 for detecting a peak or inflection point of the envelope 74 can easily detect such a point by using a differentiating circuit and zero-crossing comparator. In the third embodiment, second-order differentiation is performed to form a signal 75, and an inflection point of the envelope 74 is detected (signal 76) by referring to a gate signal compared with the threshold level 72 and signal 73. When the timer 12 which is operated by the above start signal is stopped by using this signal 76, a group delay time Tg associated with the group velocity Vg can be detected.

As in the first and second embodiments, this group delay time Tg includes a delay in the circuit associated with waveform processing. However, for the sake of simple explanation, therefore, it is assumed that there is no circuit delay time.

According to the above description, the distance L between the sound wave generator 43 and each of the sensors 3_Sa to 3_Sd can be obtained by equation (1).

The output signal 73 from the sensors 3_Sa to 3_Sd is input to a Tp signal detection circuit 86 after unnecessary frequency components are removed from the signal by a bandpass filter 84. The Tp signal detection circuit 86 is comprised of a zero-crossing comparator, multivibrator, and the like. A signal associated with a zero-crossing point of the signal output from the bandpass filter 84 is compared with a gate signal 77 generated by a gate signal generating circuit 85 for comparing a signal with a predetermined threshold level, thereby generating a signal 78.

After this operation, a signal 79 is generated, which outputs the first zero-crossing point at which the phase of the signal waveform output from the bandpass filter 84 crosses from the negative side to the positive side. Likewise, a phase delay time Tp_2 associated with a phase velocity Vp can be detected such that the timer 12 operating in accordance with the start signal described above is stopped using this signal 79.

This signal 79, however, changes depending on the signal level of the signal 73, as described above. If, for example, the signal level decreases, the gate signal generation position changes due to a gate signal compared with a threshold. For example, a signal 78' shows this state. However, the difference between this phase delay time Tp_2 and the signal Tp obtained in the first embodiment is an integer multiple of the phase period of the detection signal waveform 73, and the following relation is always satisfied:

$$Tp = Tp\_2 + n \times T \quad (3)$$

where n is an integer, and T is the phase period of a detection signal waveform, which is a known value. A substitution of equation (3) into equation (2) and the use of equation (1) yield $$n = Int[(Vg \times Tg - Vp \times Tp\_2)/\lambda p + 0.5] \quad (4)$$

where λp is the wavelength of a sound wave, which is equal to the product of the phase velocity Vp and a period T. Therefore, the integer n becomes a known value, and the distance L can be calculated with high precision by using equations (2) and (3).

According to the above description, there are a time difference Δ between the signals 56 and 59 in FIG. 3 and a time difference Δ between the signals 76 and 78 in FIG. 6. The group velocity Vg at which a sound wave propagates in the air is equal to the phase velocity Vp, and hence this time difference Δ is a fixed amount. For this reason, like a circuit delay, the influence of this time difference is completely eliminated by a method to be described above. Assume therefore that Δ=0.

As described above, unlike the first embodiment, the second and third embodiments are configured to calculate a distance from the phase information of a signal waveform, and hence can measure a distance with a higher precision.

The detection point of a phase delay time in the third embodiment is located closer to the head portion of a detection signal waveform 53 or 73 than that in the second embodiment. With this arrangement, the influence of reflected waves can be further reduced. More specifically, as shown in FIG. 13, when a sound wave is emitted into the air, if a reflecting surface (the display 6 serving as a coordinate input surface in FIG. 13) exists, the direct wave that strikes the sensor 3 from the sound wave generator 43 and the reflected wave that strikes the sensor 3 through the reflecting surface are detected with a time delay corresponding to the difference in length between the paths of the direct wave and reflected wave. To avoid the influence of this reflected wave, the detection points for the group delay time Tg and phase delay time Tp are preferably set closer to the head portion of the signal waveform of the direct wave.

According to the present invention, therefore, to specify the detection point for the group delay time Tg, an inflection point (second-order differentiation) which is located closer to the head portion than a peak of en envelope (first-order differentiation) is used instead of the peak of the envelope. In addition, since the detection point for the phase delay time Tp in the third embodiment is located closer to the head portion of a detection signal waveform than that in the second embodiment, the third embodiment is more resistant to the above influence of a reflected wave, and hence can be said to have an excellent arrangement that allows coordinate calculation with a higher precision. In addition, the group delay time Tg in the third embodiment is used for only equation (4) for calculating the integer n by the above computation method. Furthermore, in calculation based on equation (4), since rounding (rounding a number to the nearest integer) is executed, the calculation result is not influenced by a reflected wave as long as an error in the group delay time Tg due to the influence of the reflected wave falls within half the period of the phase of a detected signal waveform (i.e., within half the wavelength). The third embodiment can therefore be said to have an excellent arrangement which can eliminate the influence of a reflected wave more effectively.

However, the second embodiment can perform detection only with the phase delay time Tp, unlike the third embodiment which must detect both the group delay time Tg and the phase delay time Tp, and hence has a better advantageous arrangement in terms of cost. Therefore, the adoption of either of the embodiments depends on the specification of a target product.

In the above embodiment, the detected time includes the electrical processing time by the circuit and the like in addition to the time required for the sound wave emitted from the sound wave generator 43 to arrive at each of the sensors 3_Sa to 3_Sd. Therefore, a method of removing the time measured other than the time taken for a sound wave to propagate will be described below.

The group delay time Tg latched by the latch circuit and the phase delay time Tp include a group circuit delay time etg and phase circuit delay time etp, respectively. These circuit delay times always include the same value for each time measurement. Letting t* be the time measured by a given measuring circuit when a sound wave propagates from the sound wave generator 43 to each of the sensors 3_Sa to 3_Sd, e be the circuit delay time in the measuring circuit, and t be the time actually taken for the sound wave to propagate from the sound wave generator 43 to each of the sensors 3_Sa to 3_Sd, $$t^* = t + e \quad (5)$$

Letting tini* be the time measurement value at a known distance Lini between the sound wave generator 43 and each sensor, e be the circuit delay time in the measuring circuit, and tini be the time actually taken for the sound wave to propagate, $$tini^* = tini + e \quad (6)$$

Therefore, $$t^* - tini^* = t - tini \quad (7)$$

Letting V be the sound velocity of the sound wave, $$V \times (t^* - tini^*) = V \times (t - tini) \quad (8)$$
$$= V \times t - Lini$$

Consequently, the arbitrary distance L (to be obtained) between the sound wave generator 43 and the sensor 3 is given by $$L = V \times t = V \times (t^* - tini^*) + Lini \quad (9)$$

If the known distance Lini and the time measurement value tini* at the distance (the group delay time Tgini* in the first embodiment, the phase delay time Tpini* in the second embodiment, or both in the third embodiment) are stored in a storage medium such as a nonvolatile memory at the time of shipment, an arbitrary distance between the sound wave generator 43 and each of the sensors 3 can be accurately calculated. As described above, since both the time difference Δ between the signals 56 and 58 and the time difference Δ between the signals 76 and 78 in FIG. 6 are fixed amounts (in general, the group velocity Vg at which a sound wave propagates in the air is equal to the phase velocity Vp), the influence of such time differences can be eliminated by the above method.

A method of obtaining position coordinates (X, Y, Z) of the sound wave generator 43 when the sensors 3_Sa to 3_Sd are arranged in a coordinate system like the one shown in FIG. 8 will be described next.

Letting La to Ld be the distances from the sound wave generator 43 to the respective sensors 3_Sa to 3_Sd, which are accurately obtained by the above method, Xs–s be the distance between the sensors in the X direction, and Ys–s be the distance between the sensors in the Y direction, $$Lb^2 - \left(\frac{Xs-s}{2} + X\right)^2 = Lc^2 - \left(\frac{Xs-s}{2} - x\right)^2 \quad (10)$$

$$x = \frac{Lb^2 - Lc^2}{2Xs-s} \quad (11)$$

Likewise, $$y = \frac{Lb^2 - La^2}{2Ys-s} \quad (12)$$

$$z = \sqrt{Lb^2 - \left(\frac{Xs-s}{2} + x\right)^2 - \left(\frac{Ys-s}{2} + y\right)^2} \quad (13)$$

As described above, if at least three of the distances from the sound wave generator 43 to the sensors 3_Sa to 3_Sd can be measured, the position (space) coordinates of the sound wave generator 43 can be easily obtained. In the present invention, four sensors are used. For example, the information obtained by the sensor located at the largest distance is not used (in this case, the signal output from the sensor 3 has the lowest signal level because it is located at the largest distance), and coordinates are calculated by using only the three remaining pieces of distance information, thereby allowing coordinate calculation with high reliability.

In addition, whether an output coordinate value has high reliability can be determined by using the distance information obtained by the sensor at the largest distance.

More specifically, for example, the coordinate value calculated from pieces of distance information La, Lb, and Lc should be equal to the coordinate value calculated from the pieces of distance information Lb and Lc and distance information Ld (computations are performed with different combinations of pieces of distance information). If they do not coincide with each other, it indicates that one of the pieces of distance information is wrong, i.e., erroneously detected. In such a case, the coordinate value is not output to improve the reliability.

The operation modes of the coordinate input apparatus capable of calculating space coordinates according to the present invention will be described next.

FIG. 9 shows the outer appearance of the coordinate input pen according to the present invention.

Figure 10B:
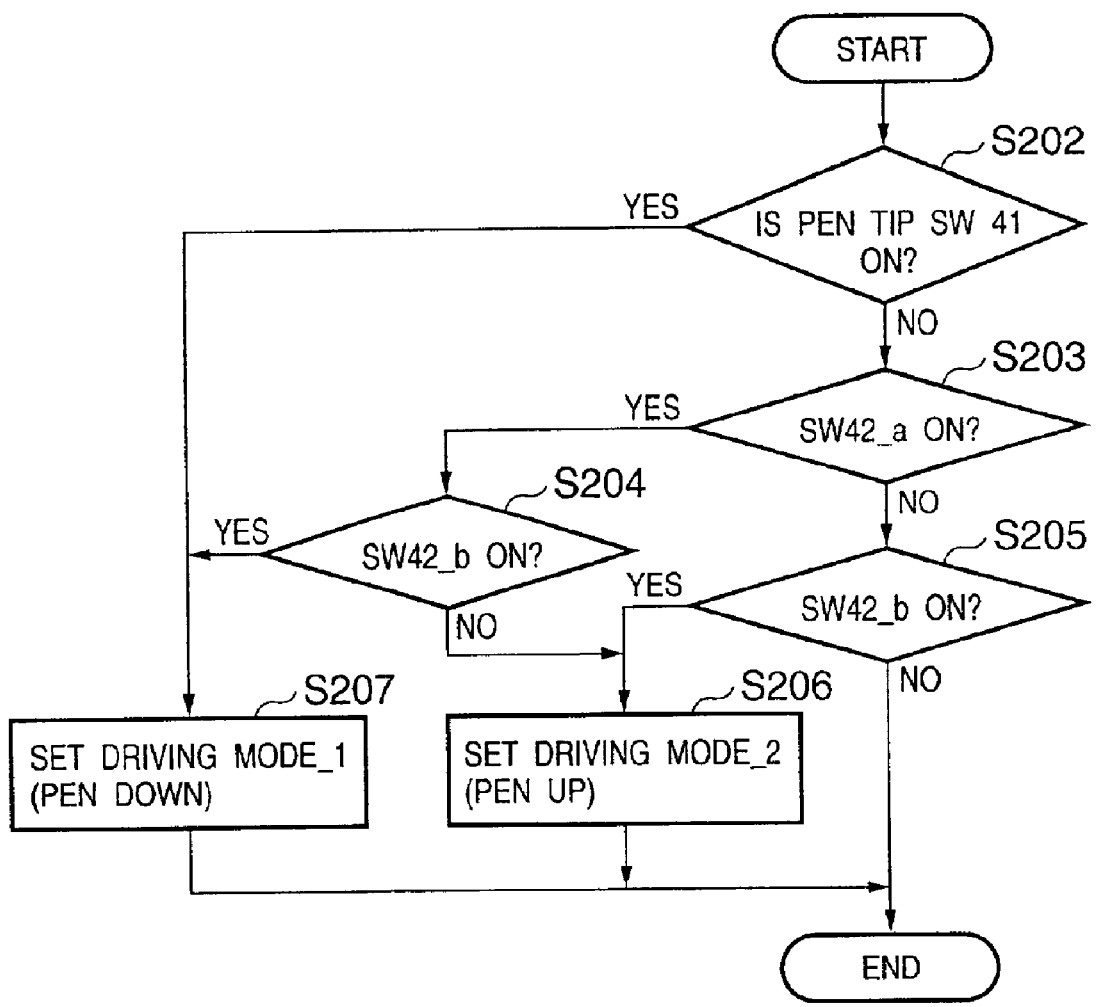
FIG. 10B is a flow chart for explaining the operation of the coordinate input pen according to the present invention.

As shown in FIG. 9, the coordinate input pen 4 is comprised of a pen tip SW 41 and two pen side SWs 42_a and 42_b. The operation mode of each SW will be additionally described with reference to FIGS. 10A and 10B.

Figure 8:
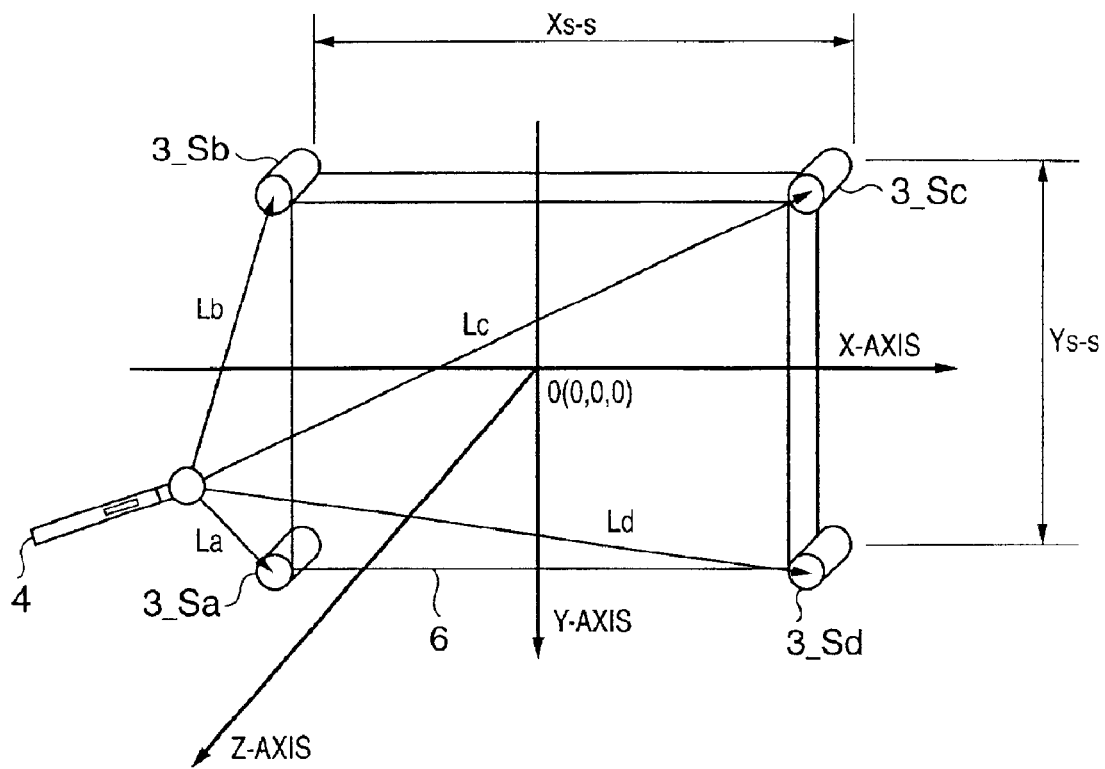
FIG. 8 is a view for explaining a coordinate system according to the present invention.

When the operator holds the coordinate input pen 4 and presses it against a coordinate input surface (in this case, an X-Y plane (z=0) is set on the window surface of a display 6, as shown in FIG. 8), the pen tip SW 41 operates. In step S201, it is checked whether the pen tip SW 41 is ON. If the pen tip SW 41 is not ON (NO in step S202), the flow advances to step S203. If the pen tip SW 41 is ON (YES in step S202), the flow advances to step S207. As a consequence, the sound wave generator 43 is driven by the driving circuit 44 at the first predetermined period (e.g., 50/sec) to emit a sound wave into the air at the first predetermined period. At this time, the coordinate value calculated by the coordinate input apparatus of the present invention is an absolute coordinate value (X, Y, 0), which is directly output to an external apparatus or the like, thereby allowing the operator to perform writing operation (pen-down state: driving Mode_1).

If the pen tip SW 41 is not ON, i.e., is OFF, it indicates at least a state where the operator is not performing coordinate input operation on the X-Y plane (z=0). Even in such a case, it is preferable that the operator can perform operation, e.g., moving the cursor displayed on the window (pen-up state: driving Mode_2). In order to realize this operation, the coordinate input pen 4 according to the present invention has the pen side SWs 42_a and 42_b.

In steps S203 to S205, it is checked whether the pen side SWs 42_a and 42_b are ON. If it is determined on the basis of this determination result that at least one of the pen side SWs is ON, the flow advances to step S206. As a consequence, a sound wave is emitted into the air at the second predetermined period (driving Mode_2; 40/sec). Assume that the operator wants to move the cursor by moving the coordinate input pen 4 at a distance from the input surface and to retain the moving state as a record (handwriting). In this case, when the two pen side SWs 42_a and 42_b are pressed, the flow advances to step S207 to emit a sound wave into the air at the first predetermined period (driving Mode_1), thus setting a pen-down state.

Figure 11:
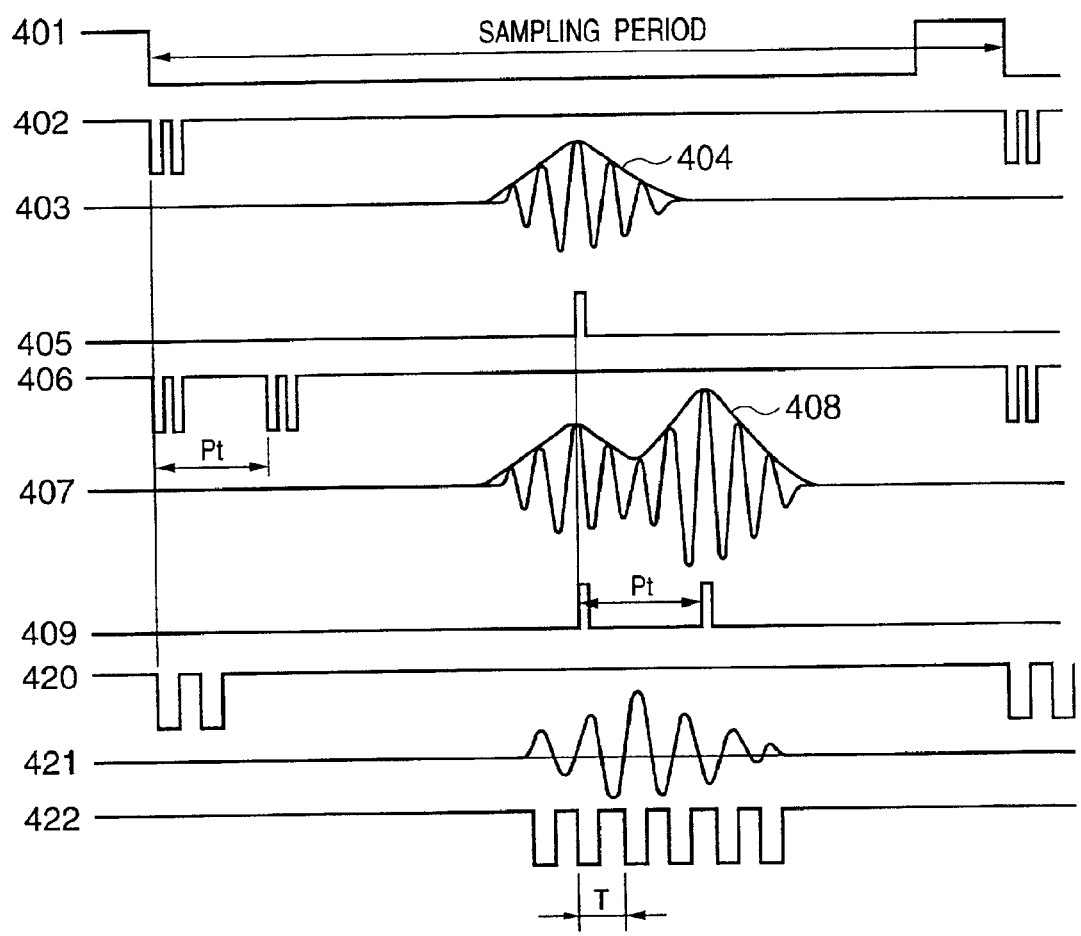
FIG. 11 is a timing chart for explaining determination of a driving mode in the coordinate input pen according to the present invention.

According to the above description, a driving mode is discriminated by measuring the sampling period at which a sound wave is generated from the sound wave generator 43 (signal 401 in FIG. 11). Another embodiment may be configured as follows. When a driving signal 402 in FIG. 11 is modulated into a driving signal 406, a detection signal waveform 403 changes to a waveform 407. For example, a mode may be discriminated by generating a signal 409 by using a peak hold circuit or the like.

In addition, a driving signal 420 is formed to change the frequency of an emitted sound wave, and a mode can be discriminated by detecting the frequency (a period T of a signal 422 in FIG. 11). In addition, the above start timing signal (this embodiment has a means for emitting a start timing signal by using the LED or the like incorporated in the coordinate input pen 4) may be modulated, and a start signal detection circuit 17 in the arithmetic control circuit 1 may detect the information of this signal.

In consideration of the influence of a reflected wave as shown in FIG. 13, the detection signal waveform 407 may be detected from even the driving signal 402 in FIG. 11. More specifically, such a case occurs in the following manner. The first peak of the detection signal waveform 407 is formed by a direct wave, and a reflected wave is then input in accordance with the difference between the path lengths of the direct wave and the reflected wave. When the difference in path length between the direct wave and the reflected wave is an integer multiple of the wavelength, the two signals are superimposed on each other to form the second peak on the signal waveform 407. In this case, therefore, whether the signal 407 is formed owing to the influence of the reflected wave or because the driving signal 401 is modulated into the signal 406 (the driving signal is changed depending on the presence/absence of a SW signal) cannot be discriminated.

According to the present invention, therefore, an occurrence period Pt of the signal 409 is monitored, and signals from all the sensors 3_Sa to 3_Sd are compared with each other to perform determination because all the differences in path length between the directed wave and reflected wave detected by the respective sensors 3_Sa to 3_Sd differ from each other. In consideration of the influence of such a reflected wave, as a method of simplifying the arrangement and attaining an advantage in terms of cost while maintaining the reliability, the method of modulating a driving period (signal 422) is superior to the method of modulating the driving waveform 401 into the waveform 406. In addition, the method of changing the sampling period is an excellent method which can completely neglect the influence of a reflected wave.

Note that in the present invention, coordinate data to be sent in pen-down operation as writing operation is preferably more precise than that in pen-up operation (in order to faithfully reproduce handwriting). In consideration of this, the sampling rate in pen-down operation is larger than that in pen-up operation.

As shown in FIG. 9, the two pen side SWs 42_a and 42_b are placed at about 90° from each other in the direction of a cross-section of the coordinate input pen 4. With this arrangement, when the operator holds the pen, the thumb automatically touches one of the switches while the forefinger automatically touches the other switch regardless of whether he/she is right-handed or left-handed. In addition to this arrangement of the pen side SWs 42_a and 42_b, the same operation mode (pen-up state) set by turning on one of the pen side SWs and the operation mode (pen-down state) that operates only when the two switches are turned on are set, thereby forming the coordinate input pen 4 exhibiting excellent usability regardless of whether the operator is right-handed or left-handed.

According to another embodiment, a single switch designed for two-stroke switching can also be effectively used. More specifically, when this switch is lightly pressed, the first-stroke switch operates (pen-up state). When the switch is further pressed, the second-stroke switch operates (pen-down state). In this case as well, a single coordinate input pen can be realized as the coordinate input pen 4 with excellent usability regardless of whether the operator is right-handed or left-handed.

The method of allowing an operator to move a cursor (pen-up state) or perform writing operation (pen-down state) by operating the pen side SWs 42_a and 42_b and inputting coordinates even at a distance from the surface of the display 6 has been described above. In such a case (where the pen tip SW 41 is not directly touching the surface of the display 6 and not operating), different specifications are required in terms of operation for a case where the above coordinate input operation is performed relatively near the display 6 (to be referred to as proximity input operation hereinafter) and a case where the coordinate input operation is performed at a distance from the display 6 (to be referred to as remote input operation hereinafter).

In proximity input operation, since the spatial distance between the display 6, which is the display surface, and the coordinate input pen 4 is a small value (the value in the Z-axis direction detected by this coordinate input apparatus is small), the operator can move the displayed cursor to a desired position intuitively and directly by moving the coordinate input pen 4.

On the other hand, when the operator is to move the displayed cursor to a desired position by remote input operation, the operator inputs coordinates upon intuitively determining that the coordinate input pen is set at a desired position. In general, however, the position of the displayed cursor deviates from the desired position. This deviation amount increases with an increase in the distance from the display surface. Therefore, the operator gradually moves the coordinate input pen 4 while visually checking the deviation amount between the position of the displayed cursor and the desired position, thereby gradually moving the position of the cursor to the desired position. In this manner, the operator achieves the object.

In other words, the operator intuitively positions the coordinate input pen 4 to a desired position, and visually checks a response (e.g., the display position of the cursor) to instruct himself/herself to correct the position of his/her hand. In accordance with this operation, the operator gradually moves the cursor to the desired position. That is, the operator repeats the loop of correcting operation based on the visual information obtained by himself/herself to achieve the object.

As described above, when the operator is to perform some remote input operation with respect to image information (image information having a coordinate system on an X-Y plane) displayed on a display or the like, he/she cannot match the coordinate value of the first point in a series of coordinate input operations with the coordinate value of the above image information. This phenomenon can be easily understood by considering a laser pointer as a tool for indicating a display image displayed on OHP or the like. When the operator determines that a desired position is indicated, a laser beam is applied. However, the first irradiation point of the laser beam is greatly separate from the desired position. The operator therefore corrects the position while seeing the point position indicated by the laser beam, thereby applying a laser beam at the desired position.

Consider general presentation, meeting, or the like using this laser pointer. It is difficult for the operator to directly indicate a desired potion. In addition, from the viewpoint of audience, the position indicated by the laser pointer moves discontinuously and abruptly. For this reason, the audience is distracted to search for an indicated position (search for an indicated position even when no pointer is irradiated with a laser beam), and hence this tool cannot be said to have satisfactory specifications as a tool for supporting the understanding of presentation contents.

An indicating stick is a classic tool for indicating a desired position. From the viewpoint of audience, however, the movement of the indicating stick operated by the operator can be visually predicted, and hence the audience can pay attention to the presentation contents. In this regard, the indicating stick can be said to be a good tool. However, the indicating tool is limited in length, the operation range is limited.

The present invention has been made in consideration of the above point, and has a coordinate output mode determination means for determining, on the basis of one-axis (e.g., Z-axis) information of a detected coordinate value (X, Y, Z), how to output the coordinate values of the two other axes (e.g., X-axis and Y-axis).

This operation will be described in detail below with reference to FIG. 12.

Figure 12:
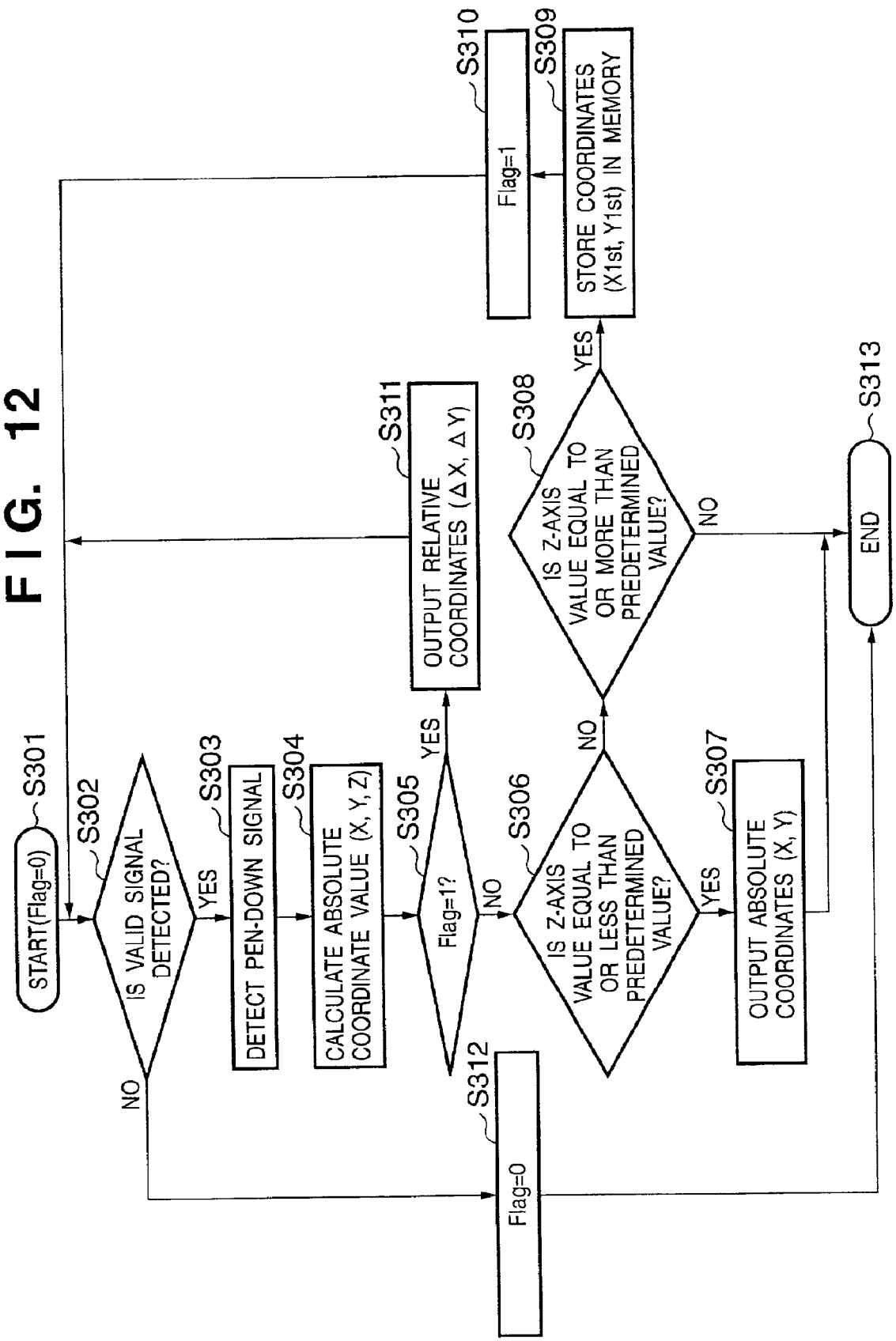
FIG. 12 is a flow chart for explaining coordinate output mode determination according to the present invention.

FIG. 12 is a flow chart for explaining coordinate output mode determination in the present invention.

First of all, the processing is started in step S301. In this case, a flag indicating whether the coordinate input apparatus is continuously outputting coordinate values is initialized (Flag=0). In step S302, it is checked whether signals necessary for coordinate computation are detected by the respective sensors 3_Sa to 3_Sd or a start signal is received. If it is determined that such signals are detected (YES in step S302), the flow advances to step S303. If it is determined such signals are not detected (NO in step S302), the flow advances to step S312.

In step S303, it is checked whether a pen-down state or pen-up state is set (see the flow chart of FIG. 10B for details), and a pen-down signal is detected on the basis of the determination result. In step S304, the position coordinates (X, Y, Z) of the coordinate input pen 4 are calculated. In step S305, it is checked whether Flag=1. If Flag=1 is not set (NO in step S305), the flow advances to step S306. If Flag=1 is set (YES in step S305), the flow advances to step S311.

In step S306, it is checked on the basis of the computed Z value whether the value is equal to or smaller than a predetermined value. If the value is equal to or smaller than the predetermined value (YES in step S306), proximity input operation is determined, and the flow advances to step S307 to output the obtained coordinate value (X, Y) on the X-Y plane without any change. The processing is then terminated. Note that if the pen tip SW 41 is ON, Z=0 is detected. In this case as well, the obtained coordinate value (X, Y) on the X-Y plane is output without any change.

If it is determined in step S306 that the value is larger than the predetermined value (NO in step S306), the flow advances to step S308 to check whether the Z value is equal to or larger than a predetermined value. If the value is equal to or larger than the predetermined value (YES in step S308), remote input operation is determined, and the flow advances to step S309 to store the obtained coordinate value (X, Y) on the X-Y plane as a coordinate value (X1st, Y1st) in a memory. In step S310, Flag=1 is set, and the flow returns to step S302. In step S302, valid signals are detected. As described above, since the coordinate input apparatus according to the present invention is designed to calculate coordinates at a predetermined sampling period (e.g., 50 points/sec), whether coordinates are continuously input can be determined by monitoring the period. If, for example, a predetermined initial start signal cannot be detected, it is determined that coordinate input operation is interrupted. Flag is then reset in step S312, and the processing is terminated.

Assume that it is determined in step S302 that coordinate input operation is continuously performed (Flag=1). In this case, after the processing in steps S303 and S304 is executed in the same manner, the flow advances from step S305 to step S311 to output the difference between the obtained coordinate value (X, Y) and the coordinate value (X1st, Y1st) stored in the memory in step S309, i.e., a relative coordinate value ($\Delta X$, $\Delta Y$). The flow then returns to step S302. At this time, to check whether the output coordinate value is the absolute coordinate value (X, Y) or relative coordinate value ($\Delta X$, $\Delta Y$), for example, the value of Flag may be output simultaneously.

According to the above description, the coordinate value (X1st, Y1st) indicates the first point in continuous coordinate input operation. However, the present invention is not limited to this. For example, the coordinate value that becomes valid first during a continuous input interval may be stored to control the subsequent coordinate values. That is, in some coordinate input apparatuses, a coordinate value input first may lack reliability (e.g., an apparatus using a coordinate detection method in which the coordinate values of first three points during a continuous input interval are not output, and the coordinate value of the fourth point where stable coordinate detection can be performed is output as a valid coordinate value). In such a case, a coordinate value (the fourth point in the above case) that becomes valid first in a continuous input interval may be stored.

According to the arrangement of the present invention, when the predetermined values in steps S306 and S308 are respectively set to 300 mm and 1,000 mm (see FIG. 10A), and a value (300 mm<Z value<1,000 mm) between the predetermined values is detected, no coordinate value is output. Obviously, however, the two values may be equal to each other and may be appropriately set in accordance with the application purpose of the apparatus.

With the above arrangement, in remote input operation, the operator can smoothly move the cursor from its current position to a desired position. In addition, while coordinate input operation is continuously performed, the moving amounts of the coordinate input pen 4 in the X and Y directions exhibit one-to-one correspondence with the moving amount of the cursor in an absolute manner. Even with remote operation, therefore, characters can be input.

With regard to the coordinate input apparatus capable of detecting three-dimensional position coordinates according to the present invention, the method of using detected one-axis information to determine the output form of the coordinate values of the two remaining axes and practical usability have been described above. As another embodiment, a method of using one-axis information as a switch signal can also be proposed.

As described above, since the coordinate input apparatus according to the present invention can determine on the basis of Flag whether continuous input operation is performed, for example, processing similar to clicking of a mouse can be detected by moving operation of the coordinate input pen 4. Consider, for example, a case where the coordinate input pen 4 is moved in only the z-axis direction. When the coordinate input pen 4 is moved from an arbitrary predetermined position in the Z-axis direction and returned to the initial position in one stroke, it is determined that operation like clicking of a mouse is performed. According to this method, therefore, if this operation is continuously performed twice, it is determined that double-click operation is performed.

This determination of switch information is based on an abrupt change in only Z-axis value detected by the coordinate input apparatus and presents a method of remotely controlling a display window by operating the coordinate input pen 4. This method is configured to monitor an abrupt change in only Z-axis value, and hence can be used together with the above method of setting a coordinate output mode based on a Z-axis value.

In addition, each embodiment of the present invention discloses a method of detecting a sound wave source position in a three-dimensional space on the basis of sound waves propagating in the air. The method of outputting three-dimensional position coordinates is not limited to the method employed by the three-dimensional coordinate input apparatus. Obviously, for example, a three-dimensional input apparatus (optical system) using light can be used.

According to the above description, all the processes described above are executed by, for example, the microcomputer in the arithmetic control circuit 1 of the coordinate input apparatus, and the coordinate input apparatus determines an output form for a two-dimensional coordinate value by referring to the value of Z of the obtained space coordinates (X, Y, Z) of the coordinate input pen 4 and outputs the corresponding information to an external apparatus or the like. However, the following arrangement is also conceivable as another embodiment.

The main body of the coordinate input apparatus detects the space coordinates (X, Y, Z) of the coordinate input pen 4 and outputs the result to an external device without any change. The external device constituted by a personal computer and the like receives the space coordinates detected by the coordinate input apparatus, and can determine whether continuous coordinate input operation is performed, by monitoring the reception timing. Therefore, effects and operability similar to those described above can be obtained when the external device constituted by the personal computer and the like determines an output form for X- and Y-axis values by referring to a Z-axis value using the same method as described above, and outputs the corresponding information to another application software installed in the personal computer.

As described above, according to the above embodiments, only the time taken for a sound wave to propagate from the coordinate input pen 4 to each of the sensors 3_Sa to 3_Sd can be stably detected without being influenced by a reflected wave regardless of the signal detection level. This makes it possible to calculate three-dimensional (space) coordinates with high reliability and precision. In addition, the detection scheme of the present invention is independent of the signal detection level, and hence has excellent yield characteristics associated with part tolerance and the like and can be realized at a low cost. In addition, since this scheme uses sound waves propagating in the air as signals, a display apparatus can be used together with this coordinate input apparatus without any deterioration in image quality.

In addition, the pen tip SW 41 is mounted on the distal end portion of the coordinate input pen 4, and at least two pen side SWs 42_a and 42_b are mounted on the coordinate input pen 4 to be symmetrical with respect to a cross-section including the axis of the coordinate input pen 4. The same operation mode is set when either of the two pen side switches is turned on. This makes it possible to form a coordinate input pen with high operability regardless of whether a user is right-handed or left-handed.

Furthermore, a mode is set in the coordinate input apparatus by using at least one-axis data of the detected three-dimensional position coordinate (X, Y, Z) data of the coordinate input pen 4, and a method of outputting the coordinate values of the two remaining axes is determined in accordance with the mode. If, for example, the Z value is small, proximity input operation is determined, and the coordinates (X, Y) are output without any change. If the Z value is relatively large, remote input operation is determined, and the coordinates are processed to be output as (ΔX, ΔY). With this arrangement, even remote operation allows the user to input characters and graphic patterns as well as performing pointing operation for indicating a predetermined position.

Moreover, a command can be input by remote operation by transmitting switch information using at least one-axis date of the obtained three-dimensional position coordinate (X, Y, Z) data of the coordinate input pen 4.

The object of the present invention is realized even by supplying a storage medium storing software program codes for realizing the functions of the above-described embodiments to a system or apparatus, and causing the computer (or a CPU or an MPU) of the system or apparatus to read out and execute the program codes stored in the storage medium.

In this case, the program codes read out from the storage medium realize the functions of the above-described embodiments by themselves, and the storage medium storing the program codes constitutes the present invention.

As a storage medium for supplying the program codes, a floppy disk, a hard disk, an optical disk, a magnetooptical disk, a CD-ROM, a CD-R/RW, a DVD-ROM/RAM, a magnetic tape, a nonvolatile memory card, a ROM, or the like can be used.

The functions of the above-described embodiments are realized not only when the readout program codes are executed by the computer but also when the OS (Operating System) running on the computer performs part or all of actual processing on the basis of the instructions of the program codes.

The functions of the above-described embodiments are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

When the present invention is applied to the above storage medium, program codes corresponding to the flow charts described above are stored in the storage medium.

As many apparently widely different embodiments of the present invention can be made without departing from the spirit and scope thereof, it is to be understood that the invention is not limited to the specific embodiments thereof except as defined in the appended claims.

What is claimed is:

1. A coordinate input apparatus which detects three-dimensional position coordinates of an indicating tool, comprising:
    detection means for detecting a three-dimensional coordinate value of the indicating tool which is defined in first, second, and third dimensions;
    comparing means for comparing a coordinate value in the first dimension of the three-dimensional coordinate value with a predetermined value;
    storage means for storing a first coordinate value detected by said detection means at a first time point in an any period; and
    control means for controlling outputting of a difference between the first coordinate value and a second coordinate value detected by said detection means after the first time point.

2. The apparatus according to claim 1, wherein said control means outputs the coordinate values in the second and third dimensions on the basis of the comparison result obtained by said comparing means.

3. The apparatus according to claim 1, wherein if the coordinate value in the first dimension is not more than a predetermined value, said control means outputs the coordinate values in the second and third dimensions.

4. The apparatus according to claim 1, wherein said storage means stores the first coordinate value detected by said detection means at a first time point in an any period when the coordinate value in the first dimension is not less than a predetermined value.

5. The apparatus according to claim 1, wherein said control means further outputs the comparison result obtained by said comparing means.

6. A control method for a coordinate input apparatus which detects three-dimensional position coordinates of an indicating tool, comprising:
    a detection step of detecting a three-dimensional coordinate value of the indicating tool which is defined in first, second, and third dimensions;
    a comparing step of comparing a coordinate value in the first dimension of the three-dimensional coordinate value with a predetermined value;
    a storage step for storing a first coordinate value detected in the detection step at a first time point in an any period; and
    a control step for controlling outputting of a difference between the first coordinate value and a second coordinate value detected in the detection step after the first time point.

7. The method according to claim 6, wherein in the control step, the coordinate values in the second and third dimensions are output on the basis of the comparison result obtained in the comparing step.

8. The method according to claim 6, wherein in the control step, if the coordinate value in the first dimension is not more than a predetermined value, the coordinate values in the second and third dimensions are output.

9. The method according to claim 6, wherein the storage step stores the first coordinate value detected in the detection step at a first time point in an any period when the coordinate value in the first dimension is not less than a predetermined value.

10. The method according to claim 6, wherein in the control step, the comparison result obtained in the comparing step is further output.

11. A computer-readable memory storing a program code for controlling a coordinate input apparatus which detects three-dimensional position coordinates of an indicating tool, wherein the program code comprises:
    a program code for a detection step of detecting a three-dimensional coordinate value of the indicating tool which is defined in first, second, and third dimensions;
    a program code for a comparing step of comparing a coordinate value in the first dimension of the three-dimensional coordinate value with a predetermined value;
    a program code for a storage step for storing a first coordinate value detected in the detection step at a first time point in an any period; and
    a program code for a control step for controlling outputting of the first coordinate value and a difference between a second coordinate value detected in the detection step after the first time point.

12. The apparatus according to claim 1, further comprising display means, and wherein said first dimension is a vertical direction for a display screen of said display means.

13. The method according to claim 6, wherein said coordinate input apparatus further comprises a display means, and wherein said first dimension is a vertical direction for a display screen of said display means.

* * * * *

UNITED STATES PATENT AND TRADEMARK OFFICE
CERTIFICATE OF CORRECTION

PATENT NO. : 6,862,019 B2
DATED : March 1, 2005
INVENTOR(S) : Katsuyuki Kobayashi et al.

It is certified that error appears in the above-identified patent and that said Letters Patent is hereby corrected as shown below:

Column 6,
Line 24, "depends" should read -- depends on --.

Column 8,
Line 62, "en" should read -- an --.

Column 13,
Line 42, "potion." should read -- position. --.

Signed and Sealed this

Thirty-first Day of January, 2006

JON W. DUDAS
*Director of the United States Patent and Trademark Office*